United States Patent [19]

Sezginer et al.

[11] Patent Number: 5,510,712
[45] Date of Patent: Apr. 23, 1996

[54] METHOD AND APPARATUS FOR MEASURING FORMATION RESISTIVITY IN CASED HOLES

[75] Inventors: Abdurrahman Sezginer, Brookfield; Vladimir L. Druskin, Ridgefield, both of Conn.

[73] Assignee: Schlumberger Technology Corporation, Ridgefield, Conn.

[21] Appl. No.: 236,932

[22] Filed: May 2, 1994

[51] Int. Cl.$^6$ .................................................... G01V 3/20
[52] U.S. Cl. .................................. 324/368; 324/357
[58] Field of Search ............................ 324/347–352, 324/354, 357, 358, 363, 368–370, 372–375, 355, 371, 346; 364/422

[56] References Cited

U.S. PATENT DOCUMENTS

| | | | |
|---|---|---|---|
| 2,459,196 | 1/1949 | Stewart | 324/368 |
| 2,729,784 | 1/1956 | Fearon | 324/368 |
| 2,891,215 | 6/1959 | Fearon | 324/368 |
| 4,431,963 | 2/1984 | Walkow | 324/715 X |
| 4,431,964 | 2/1984 | Walkow | 324/715 X |
| 4,714,889 | 12/1987 | Chapman et al. | 324/366 |
| 4,748,415 | 5/1988 | Vail, III | 324/339 |

(List continued on next page.)

FOREIGN PATENT DOCUMENTS

| | | |
|---|---|---|
| 0206706A2 | 6/1986 | European Pat. Off. . |
| 2207278 | 6/1974 | France . |
| 0029753 | 1/1989 | Japan .................................... 324/368 |
| 266090 | 7/1970 | U.S.S.R. . |
| 1310141 | 4/1969 | United Kingdom . |
| 2019004 | 4/1979 | United Kingdom . |

OTHER PUBLICATIONS

Russian paper of Mademov, entitled, "Effectiveness of Resistivity Logging of Cased Wells by a Six–Electrode Device", 1ZV VYSSH. Ucheb Zavedenii, NEFT GAZ No. 7, Jul. 1987, pp. 11–15.

Paper by Schenkel et al. entitled "Numerical Study on Mesuring Electrical Resistivity through Casing in a Layered Medium", Expanded Abstracts, Society of Exploration Geophysicists (SEG, for the 60th Annual Meeting and Exposition, held San Francisco, Calif., Sep. 23–27, 1990., pp. 538–541.

Primary Examiner—Sandra L. O'Shea
Assistant Examiner—Jay M. Patidar
Attorney, Agent, or Firm—Martin D. Hyden; Leonard W. Pojunas

[57] ABSTRACT

A method of determining the resistivity of an underground formation surrounding a cased borehole including the steps of: a) passing a current along a first pan of the casing and measuring the voltage; b) passing a current along a second part of the casing and measuring the voltage, the second part being spaced from the first part by an intermediate region; c) measuring voltages between the first part of the casing and a point in the intermediate region and between the second part of the casing and the same point; and d) using the measured voltages to derive the resistivity of the formation. A logging tool for use in determining the resistivity of an underground formation surrounding a cased borehole includes a body having first and second pans separated by an intermediate region, wherein: a) the first body part includes a first current source having spaced electrodes arranged so as to enable a current to be passed through a corresponding pan of the casing and a voltage monitor having spaced electrodes for measuring the voltage across the pan of the casing; b) the second body pan includes second current source having spaced electrodes arranged so as to enable a current to be passed through a corresponding pan of the casing and a second voltage monitor having spaced electrodes for measuring the voltage across the part of the casing; and c) the intermediate region includes intermediate voltage monitors including electrodes for measuring a voltage between the first pan of the casing and a point in a corresponding intermediate region of the casing, and between the second part of the casing and the point in the intermediate region of the casing so as to enable the formation resistivity to be derived from the measured voltages.

21 Claims, 7 Drawing Sheets

U.S. PATENT DOCUMENTS

| | | | |
|---|---|---|---|
| 4,794,322 | 12/1988 | Davies | 324/647 |
| 4,796,186 | 1/1989 | Kaufman | 364/422 |
| 4,820,989 | 4/1989 | Vail, III | 324/368 |
| 4,837,518 | 6/1989 | Gard et al. | 324/368 |
| 4,857,831 | 8/1989 | Davies et al. | 324/357 |
| 4,882,542 | 11/1989 | Vail, III | 324/368 |
| 5,038,107 | 8/1991 | Gianzero et al. | 324/339 |
| 5,043,668 | 8/1991 | Vail, III | 324/368 |
| 5,043,669 | 8/1991 | Vail, III | 324/368 |
| 5,075,626 | 12/1991 | Vail, III | 324/368 |
| 5,187,440 | 2/1993 | Vail, III | 324/368 |
| 5,223,794 | 6/1993 | Vail, III | 324/368 |
| 5,260,661 | 11/1993 | Vail, III | 324/339 |

METHOD AND APPARATUS FOR MEASURING FORMATION RESISTIVITY IN CASED HOLES

FIELD OF THE INVENTION

The present invention relates to a method and apparatus for measuring the resistivity of an underground formation surrounding a borehole. In particular, the invention relates to a method and apparatus for use in boreholes which are lined with a casing.

DESCRIPTION OF PRIOR ART

Determination of the resistivity of an underground formation surrounding a borehole is well known as a method of evaluating the nature of the fluids in the formation so as to detect the presence of hydrocarbons. Typically this is done a short time after the well has been drilled and before any lining of the borehole is undertaken. After drilling, the borehole is normally lined by cementing steel casing therein to provide a zonal isolation and stability of the borehole. Measurement of the resistivity of a formation surrounding a completed, producing well can be useful to enable monitoring of changes in position of the water hydrocarbon interface, coning of the underlying water or the gas cap, and residual oil saturation.

Various methods have been proposed for measuring formation resistivity from cased holes. These comprise inductive techniques as described in U.S. Pat. Nos. 4,748,415 and 5,038,107, and galvanic techniques as described in U.S. Pat. Nos. 2,459,196, 4,796,186, 4,820,989, 4,882,542, 5,043,668, 5,075,626 and French Patent No. 2207278. To date, only galvanic techniques have been shown to be possible. These techniques are based on the principle that when some direct or very low frequency (1 Hz or less) alternating current is injected into the casing, it flows predominantly along the casing, but also leaks slowly into the formation. The formation conductivity (resistivity) is calculated from the rate of leakage of the casing current. The current flow axially in the casing is easily observed from inside the casing by measuring the voltage drop across a section of the casing and dividing the voltage drop by the resistance of the same section. The leakage current is then obtained from the rate of change in the axial current in the casing. Such a system requires at least three voltage electrodes and two current electrodes as is described in U.S. Pat. Nos. 4,820,989, 4,882,542 and 5,075,626 and shown in FIGS. 1 and 2.

The system shown in FIGS. 1 and 2 comprises a sonde 10, comprising electrodes A, $M_1$, $M_2$, $M_3$ and $B_0$, which is lowered into the cased well 12 by means of a wireline 14 and which is connected therethrough to a current return electrode $B_1$ and a voltage electrode N, both of which are located at the surface. The system is arranged initially to compensate for inhomogeneities in the casing as shown in FIG. 1.

A current source $I_0$ is connected between the electrodes A and $B_0$ which are a few meters apart and voltages measured at M, $M_2$ and $M_3$, as shown in FIG. 1. In this configuration most of the current flows in the casing 12. Therefore, the voltage $V_M^{o_1}{}_{M_2}$ is to a very good approximation, equal to $I_0 R_{M_1 M_2}$ and the voltage $V_M^{o_2}{}_{M_3}$ is equal to $I_0 R_{M_2 M_3}$. From these measurements one obtains the resistance of the casing sections $R_{M_1 M_2}$ and $R_{M_2 M_3}$ for future use $$R_{M_1M_2}=V_M^{o_2}{}_{M_3}/I_0 \qquad (1)$$

$$R_{M_2M_3}=V_M^{o_2}{}_{M_3}/I_0$$

or equivalently, one adjusts the gain of at least one of the amplifiers so that $V_1-V_2$ is zero as shown in FIG. 1.

The arrangement of the system for measurement of the radial current is shown in FIG. 2. The return of the current source is connected to electrode $B_1$ at the surface. In this case all of the current injected into the casing at electrode A eventually leaves the casing and returns to electrode $B_1$. The current that leaves the casing from a section of length $\Delta z$ centered at $M_2$ is the difference between the axial currents in the sections $M_1 M_2$ and $M_2 M_3$:

$$I_r = I_{z1} - I_{z2} \qquad (2)$$

$$I_{z1} = \frac{V^1_{M_1M_2}}{R_{M_1M_2}}$$

$$I_{z2} = \frac{V^1_{M_2M_3}}{R_{M_2M_3}}$$

The voltage difference between one of the downhole voltage electrodes such as $M_3$ and an electrode N at the surface is also measured. Electrode N must be far away (several hundred meters) from the current return electrode $B_1$. Ideally, the return electrodes N and $B_1$ are infinitely far away and they do not affect the downhole measurements. In other words, the current source is ideally a monopole whereas the radial current is measured by a quadrapole receiver. The formation resistivity is obtained by $$R_t = K \frac{V_{m_3 N} \Delta z}{I_r} \qquad (3)$$

where $\Delta z$ is the spacing of the downhole voltage electrodes and K is a dimensionless proportionality constant of order 1.

Since $I_{z1}$ and $I_{z2}$ are typically 100 to 10000 times larger than $I_r=I_{z1}-I_{z2}$ depending on the casing size and the formation resistivity, all quantities leading to the calculation of $I_r$ must be accurate to 3 to 5 digits if the formation factor is to be estimated with 10% accuracy. No measurement scheme is likely to circumvent this fundamental difficulty.

It is an object of the invention to provide a system for measuring formation resistivity from a cased hole in which these problems are avoided. In particular, it is an object of the invention to provide a system in which the need for electrodes at the surface is removed.

SUMMARY OF THE INVENTION

A first aspect of the invention provides a method of determining the resistivity of an underground formation surrounding a cased borehole including the steps of causing a current to flow along a first part of the casing, and in an opposite direction, along a second part of the casing which is spaced from the first part by an intermediate region. The voltages across the first and second part of the casing, between the first part of the casing and a point in the intermediate region, and between the second part of the casing and that point are measured and the formation resistivity is derived from these voltages.

A second aspect of the method according to the invention comprises the further steps of passing a known current along the intermediate region and measuring the voltage across this region. In this case, the resistance of the region is derived from the magnitude of the current and the measured voltage and the resistivity of the formation is derived from a knowledge of the voltages across the first and second part of the casing and the intermediate region and the resistance of the intermediate region.

A third aspect of the invention provides an apparatus for use in determining the resistivity of an underground formation surrounding a cased borehole and comprises a body including first and second parts separated by an intermediate region. The first body part comprises a first current source including spaced electrodes arranged so as to enable a current to flow in a corresponding first part of the casing and first voltage monitoring means including spaced electrodes for sensing a voltage across the first part of the casing. The second body part comprises a second current source including spaced electrodes arranged so as to enable a current to flow in a corresponding second part of the casing and second voltage measuring means including spaced electrodes for sensing a voltage across the second part of the casing. The intermediate region comprises first intermediate voltage monitoring means including electrodes for sensing a voltage between the first part of the casing and a point in a corresponding intermediate region of the casing, and second intermediate voltage monitoring means including electrodes for sensing a voltage between the second part of the casing and the point in the intermediate region of the casing.

BRIEF DESCRIPTION OF THE DRAWINGS

The present invention will now be described by way of example, with reference to the accompanying drawings in which.

DESCRIPTION OF THE PREFERRED EMBODIMENT

Figure 1:
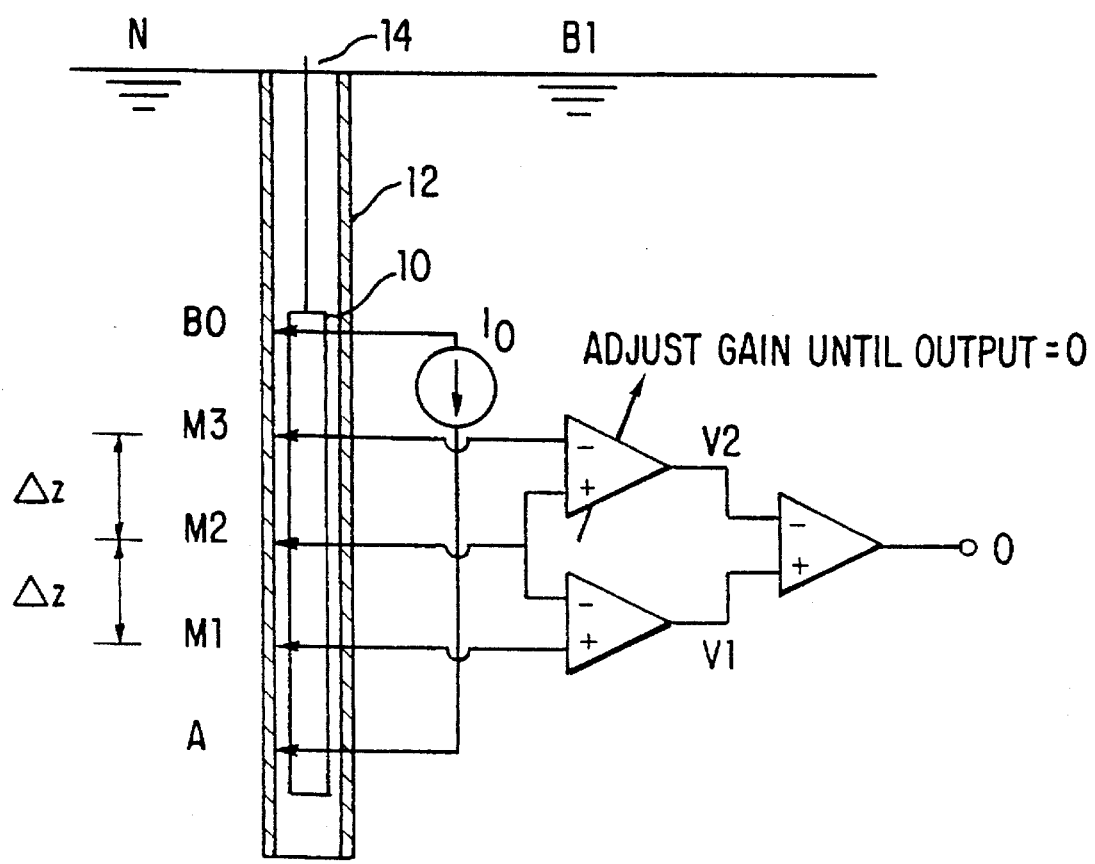
FIG. 1 shows a schematic view of a prior art system for measuring the resistivity of a section of casing.
Figure 2:
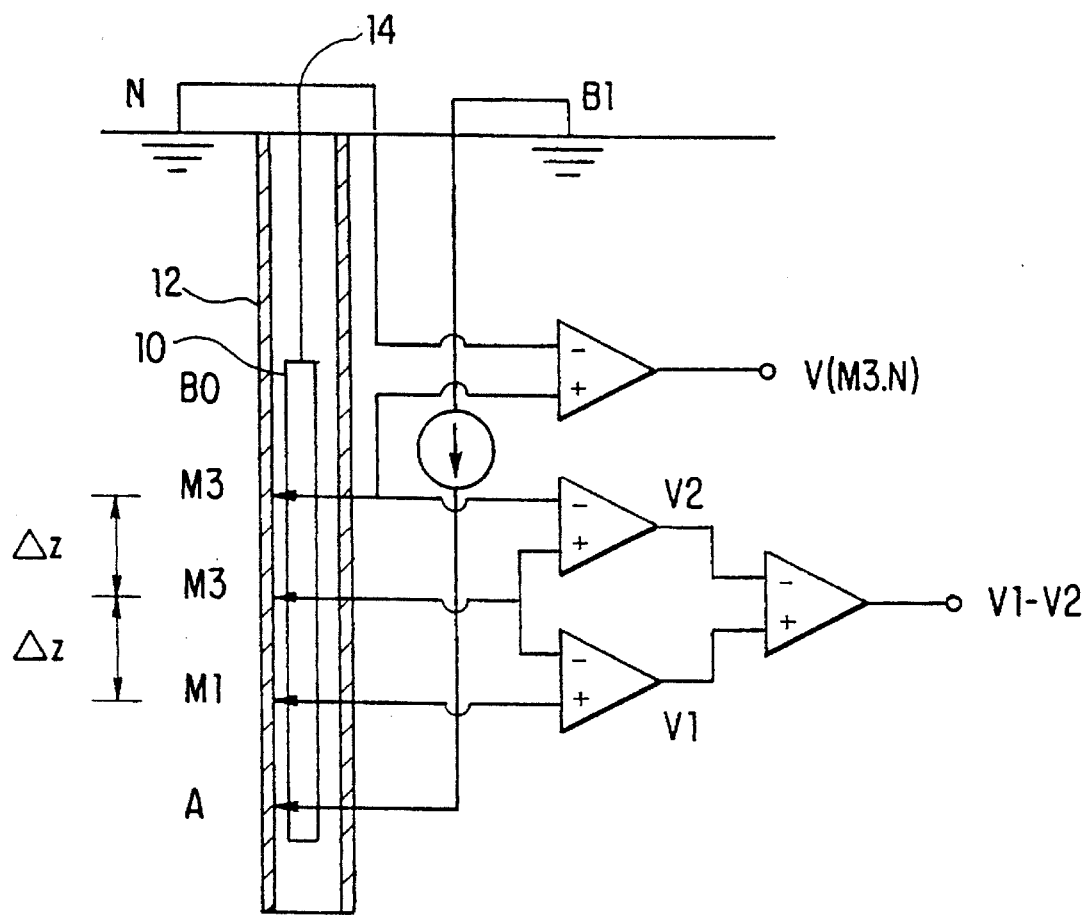
FIG. 2 shows a schematic view of a prior art system for measuring formation resistivity.
Figure 3:
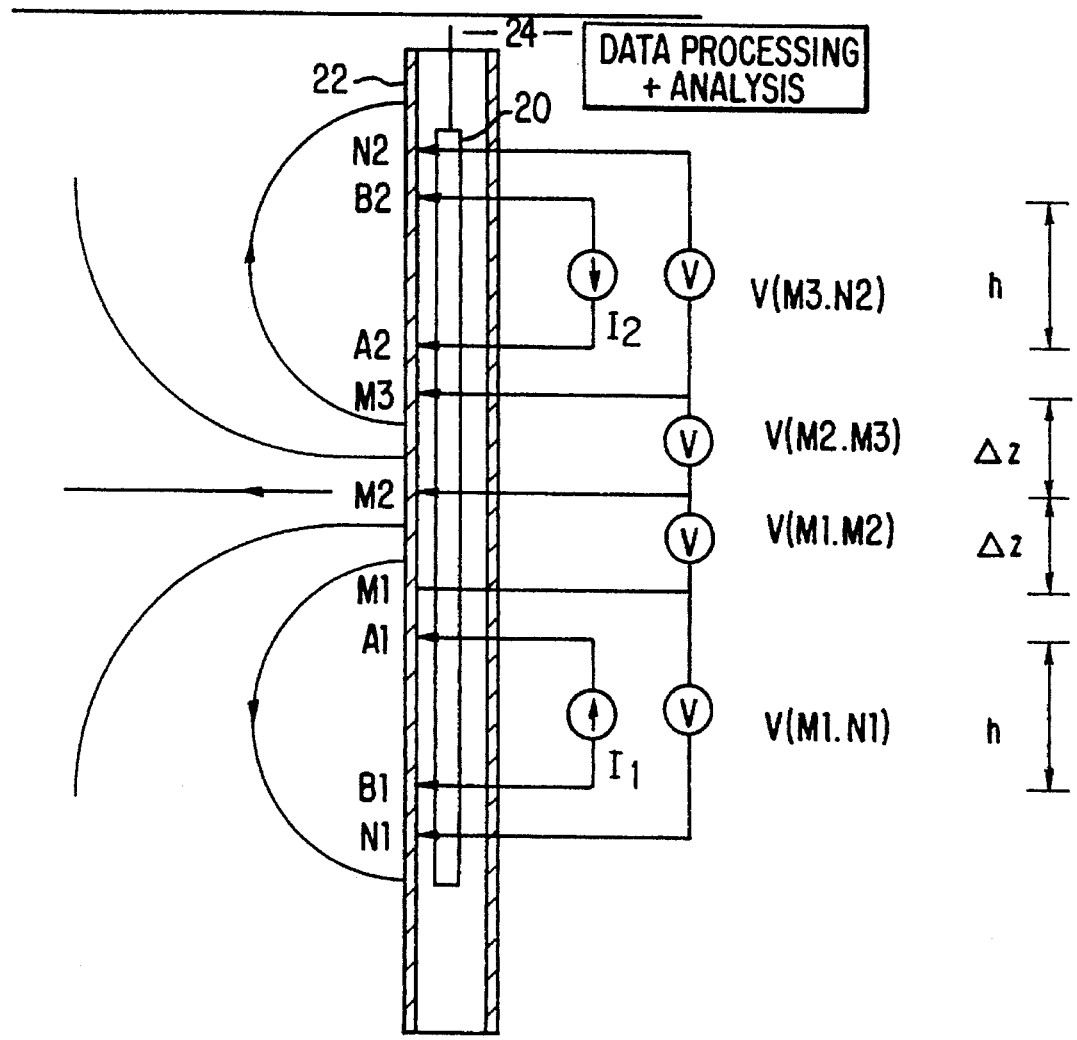
FIG. 3 shows a schematic view of an embodiment of the present invention for measuring formation resistivity.
Figure 4:
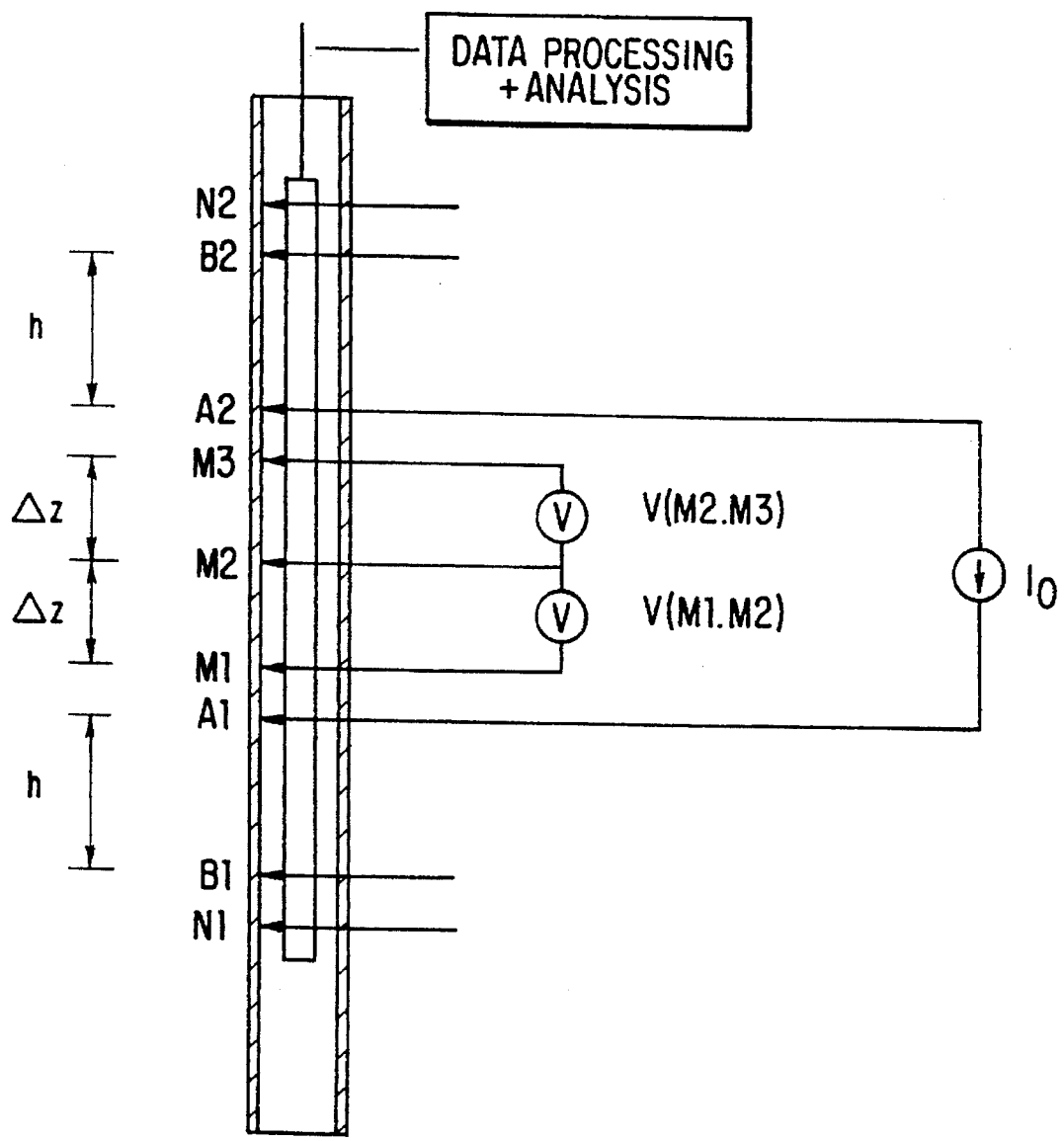
FIG. 4 shows a schematic view of the embodiment of FIG. 3 arranged to measure casing resistance.

The system shown in FIG. 3 and 4 comprises a sonde shown schematically at 20 which can be lowered into the cased borehole 22 by means of a wireline cable 24 which allows power to be supplied to the tool from the surface and data to be returned to the surface for storage, processing and display. The sonde 20 comprises a series of electrodes $N_1$, $B_1$, $A_1$, $M_1$, $M_2$, $M_3$, $A_2$, $B_2$ and $N_2$. Electrodes $B_1$ and $A_1$ and electrodes $A_2$ and $B_2$ are connected to respective current sources $I_1$ and $I_2$. Voltage measurements $V(M_1,N_1)$, $V(M_1,M_2)$, $V(M_2,M_3)$ and $V(M_3, N_2)$ are provided across the electrodes $N_1$, $M_1$, $M_2$, $M_3$ and $N_2$. Electrodes $N_1$, $B_1$ are separate but are positioned sufficiently close as to provide current or measure voltage at substantially the same position. The same applies to electrode pairs $A_1$ and $M_1$, $M_3$ and $A_2$, and $B_2$ and $N_2$. A further current source $I_0$ is provided between electrodes $A_1$ and $A_2$ for determining the resistance of the casing in the intermediate region $M_1 M_3$. All of these components are contained in the sonde 22 but are shown outside for clarity.

The system according to the invention differs from the prior art in that there are no voltage or current electrodes at the surface. The return electrodes are downhole and a dipole current source is used instead of a monopole current source.

Initially a current source of strength $I_0$ is connected across the electrodes $A_1$ and $A_2$ as shown in FIG. 4 and the resistances of the casing sections $M_1 M_2$ and $M_2 M_3$ are calculated according to Equation (1). A current source is connected across the electrodes $A_1$ and $B_1$ and a second current source is connected across the electrodes $A_2$ and $B_2$, the currents flowing in opposite directions. The ratio of these two current sources is adjusted so that $V_{M_1 M_3}$ is zero. Using two current sources and enforcing the condition $V_{M_1 M_3}=0$ makes the radial current emanating from the section $M_1 M_3$ more radially focused and symmetric. The radial current $I_r$ is once again calculated according to Equation (2). The formation resistivity is estimated from the radial current by $$R_t = K \frac{V \Delta z}{I_r} \tag{3'}$$

where $\Delta z$ is the spacing of the voltage electrodes $M_1$, $M_2$, and $M_3$, and K is a dimensionless proportionality constant of order 1. The voltage V that drives the radial current is approximately taken as the average of $V_{M_1 N_1}$ and $V_{M_3 N_2}$ which are measured initially. The motivation for taking $V=(V_{M_1 N_1}+V_{M_3 N_2})/2$ is as follows: The casing potential changes very slowly outside the section $B_1 B_2$; it increases linearly from $B_1$ to $A_1$; remains constant from $A_1$ to $A_2$; and decreases linearly from $A_2$ to $B_2$. The potential of the casing section $A_1 A_2$ is raised with respect to the rest of the casing approximately by V volts. The radial current is emitted from the section $A_1 A_2$ and it returns to the casing below $B_1$ and above $B_2$ as shown in FIG. 3. As the length of the equipotential section $|A_1 A_2|$ increases, passive focusing becomes more effective and the depth of investigation increases.

The current electrodes $A_1$, $B_1$, $A_2$, and $B_2$ and the voltage electrodes $M_1$, $N_1$, $M_3$ and $N_2$ are distinct (current sources and voltmeters do not share their electrodes) to avoid corrupting voltage measurements by the voltage drops on the contact impedances. Instead of using two current sources and adjusting their relative amplitudes, one current source can be used at a time and the measured voltages can be superposed in software during data processing. In this approach, there is no need for adjusting the current source, and its exact value is immaterial. A current source is connected across electrodes $A_1$ and $B_1$ and the voltages $V_M^{11}{}_{M_2}$, $V_M^{12}{}_{M_3}$, and $V_M^{11}{}_{N_1}$ are measured. A current source is connected across electrodes $A_2$ and $B_2$ and the voltages $V_M^{21}{}_{M_2}$, $V_M^{22}{}_{M_3}$, and $V_M^{23}{}_{N_2}$ are measured.

As in the prior art, the radial currents $I_r^{(1)}$ and $I_r^{(2)}$ are calculated as the difference of the two axial currents:

$$I_r^{(i)} = I_{z1}^{(i)} - I_{z2}^{(i)} \tag{4}$$

$$I_{z1}^{(i)} = \frac{V_{M_1 M_2}^{(i)}}{R_{M_1 M_2}} \tag{5}$$

$$I_{z2}^{(i)} = \frac{V_{M_2 M_3}^{(i)}}{R_{M_2 M_3}} \quad ; i=1,2 \tag{6}$$

The measurements are superposed linearly by the coefficients $c_1$ and $c_2$:

$$c_1 = \frac{-V_{M_1 M_3}^2}{V_{M_1 M_3}^{(1)} - V_{M_1 M_3}^{(2)}} \tag{7}$$

-continued $$c_2 = \frac{V^1_{M_1M_3}}{V^{(1)}_{M_1M_3} - V^{(2)}_{M_1M_3}} \qquad (8)$$

where $V_M{}^{i}{}_{M_3} = V_M{}^{i}{}_{M_2} + V_M{}^{i}{}_{2M_3}$; i=1,2. This choice of coefficients satisfies $$c_1 V_M{}^{(1)1}{}_{M_3} + c_2 V_M{}^{(2)1}{}_{M_3} = 0 \qquad (9)$$

and the arbitrary normalization $c_1+c_2=1$. The radial current and the voltage driving the radial current are obtained by superposition:

$$I_r = c_1 I_r{}^{(1)} + c_2 I_r{}^{(2)} \qquad (10)$$

$$V = c_1 V_M{}^{(1)1}{}_{N_1} + c_2 V_M{}^{(2)3}{}_{N_2} \qquad (11)$$

The formation resistivity is estimated as in the previous case:

$$R_t = K \frac{V \Delta z}{I_r} \qquad (3')$$

The configuration shown in FIG. 3 provides two depths of investigation. Only the current source connected across electrodes $A_1$ and $B_1$ is turned on. Then the radial current emanating from two different sections of the casing can be measured. The current that leaves the casing further away from the source goes deeper into the formation before it returns to the casing:

$$I_r \text{(Shallow)} = \frac{V_{M_1M_2}}{R_{M_1M_2}} - \frac{V_{M_2M_3}}{R_{M_2M_3}} \qquad (12)$$

$$I_r \text{(Deep)} = \frac{V_{M_2M_3}}{R_{M_2M_3}} - \frac{V_{M_3M_2}}{R_{M_3M_2}} \qquad (13)$$

The deep measurement requires the knowledge of $R_{M_3N_2}$, which can be measured in the initial phase if the return electrode ($A_2$ in FIG. 4) is placed above $N_2$.

Let $G(z_r, z_t)$ denote the casing potential at the depth $z_r$ when unit current is injected into the casing at the depth $z_t$ with the return at infinity. In a homogeneous formation, $$G(z_r, z_t) \propto \exp(-|z_r - z_t|/L) \qquad (16)$$

where $$L^2 \propto \frac{R_t}{r_c} \qquad (17)$$

and $r_c$ is the casing resistance per unit length. Therefore, in a homogeneous medium one of the several possible estimators of formation resistivity is $$R_t \propto \frac{\frac{\partial G(z_r, z_t)}{\partial z_t}}{\frac{\partial^3 G(z_r, z_t)}{\partial z_t \partial z_r^2}} \qquad (18)$$

The term in the denominator can be interpreted as the potential due to a dipole source measured by a quadrapole receiver. Referring to FIG. 3 when one of the current sources is turned on, $$V_{M_1M_2} - V_{M_2M_3} = (\Delta z)^2 h \frac{\partial^3 G(z_r, z_t)}{\partial z_t \partial z_r^2} \qquad (19)$$

where h is the separation of voltage electrodes N1M1 or M3N2 (see FIG. 3).

In a vertically invariant situation, $$V^{(1)}_{M_1N_1} = 2V^{(1)}_{M_{1\infty}} = 2 \frac{\partial G(z_r, z_t)}{\partial z_t} \qquad (20)$$

by symmetry. Thus in a homogeneous formation $$R_t \propto \frac{V^{(1)}_{M_1N_1}}{V^{(1)}_{M_1M_2} - V^{(1)}_{M_2M_3}} \qquad (21)$$

$$\propto \frac{V^{(2)}_{M_3N_2}}{V^{(2)}_{M_1M_2} - V^{(2)}_{M_2M_3}}$$

The measurement proposed in the previous two sections is a symmetrized version of the equations above and it also includes a correction for inhomogeneous casings.

The prior art uses a surface voltage electrode which has to be far away from the surface current electrode. This arrangement makes the deployment of the tool difficult especially in sites with metal pipe-lines and fences. The proposed measurement uses only differential voltage measurement performed downhole.

In the prior art, the current injected into the casing is limited by the ohmic dissipation on the logging cable. For example, 10 A of current flowing on 4 parallel conductors of 15000 ft of logging cable dissipates 3750 W on the cable. In the present invention, the current source and both of its electrodes are downhole, which constitutes a typical circuit of about 2-ohm impedance. Such a downhole current source disspates 200 W at 10 A. The power on the logging cable can now be 60 Hz and several hundred volts, which can be transformed and rectified downhole. In this arrangement the current, hence the dissipation on the logging cable would be smaller. For example, to send 200 W downhole via 300 VAC using 4 conductors of 15000 ft of logging cable costs 67 W of additional power dissipation on the cable.

As an example of the use of this system, consider the tool in FIGS. 3 and 4 where the separations of the voltage and current electrodes are 5 meters, $$|M_1M_2|=|M_2M_3|=|A_1B_1|=|A_2B_2|=5 \text{ m,}$$

$$|N_1B_1|=|N_2B_2|=|A_1M_1|=|A_2M_3|=0.25 \text{ m,}$$

and the current source supplies 10 amperes. The length of the sonde is at least 21 meters.

Figure 5:
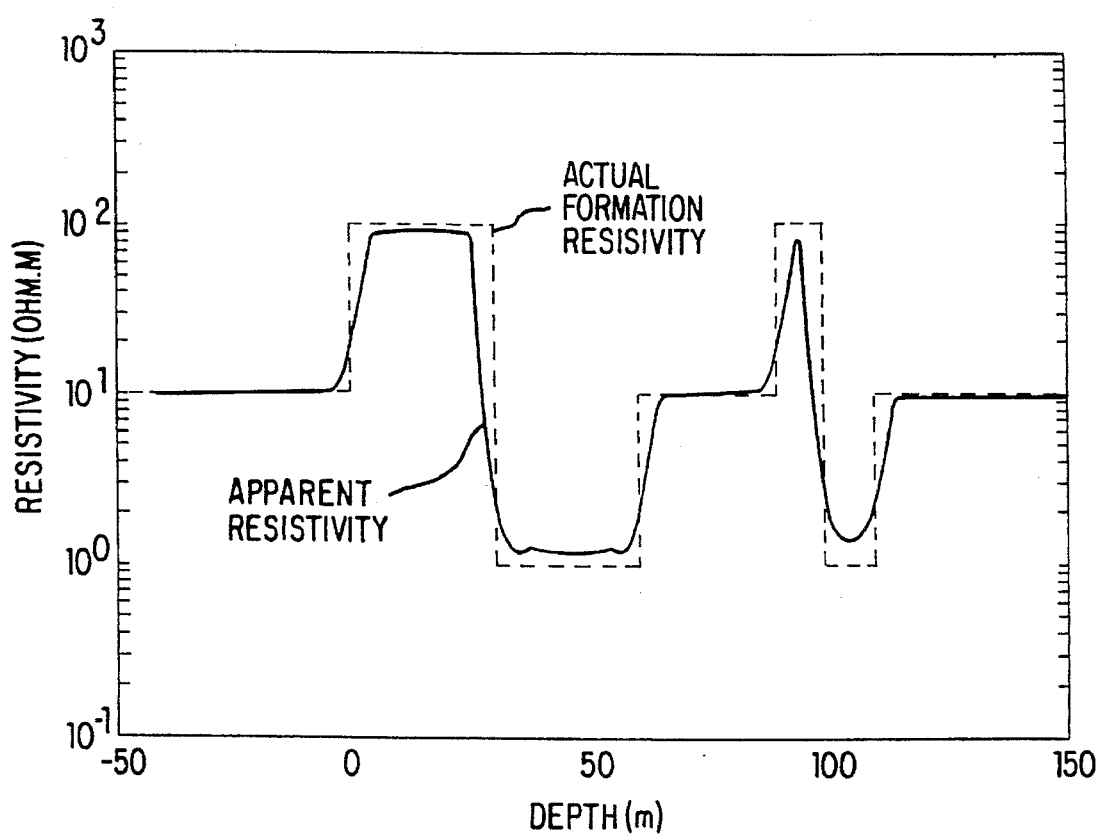
FIG. 5 shows an example of the use of the system of FIGS. 3 and 4.

The performance of such a tool was simulated by the computer code NKAR. The simulated apparent resistivity is compared to the actual resistivity in FIG. 5. The vertical resolution of the tool is on the order of $|M_1 \, M_3|$=10 m. Conductive beds appear thicker than their actual size due to shoulder bed effects.

Figure 6:
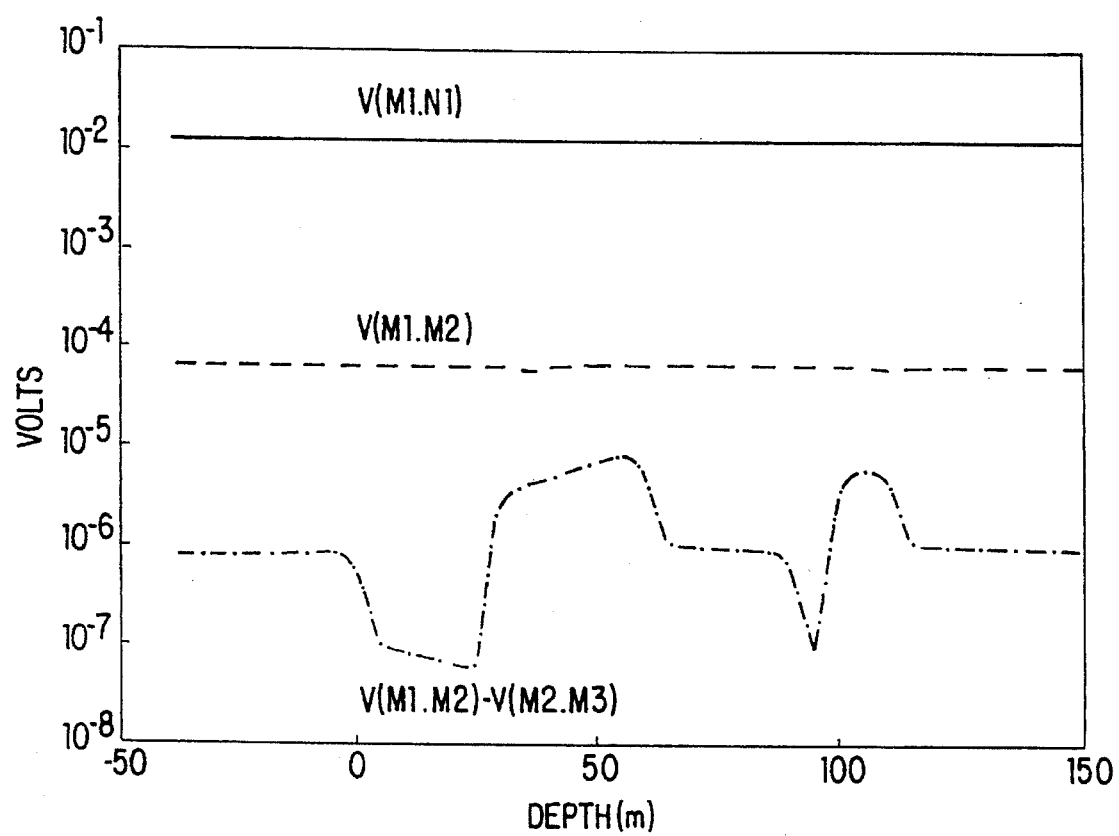
FIG. 6 shows the magnitudes of the individual voltage measurements used for the example of FIG. 5.

The magnitudes of $V_{M_1N_1}$, $V_{M_1M_2}$, and $V_{M_1M_2} - V_{M_2M_3}$ are shown in FIG. 6. The largest of these voltages, $V_{M_1N_1}$, is easy to measure but contains no information about the formation. It is proportional to the casing resistance $R_{M_1N_1}$. The voltage $V_{M_1M_2}$, the dipole-dipole measurement, is proportional to a very large scale average of the formation conductivity. It hardly changes as the tool traverses the beds. The smallest voltage $V_{M_1M_2} - V_{M_2M_3}$ is proportional to the conductivity of the bed next to the sonde (More precisely, the quantity of interest is $V_{M_1M_2} - V_{M_2M_3} R_{M_1M_2}/R_{M_2M_3}$ but the casing is taken to be uniform in the example in FIGS. 5 and 6). FIG. 6 indicates that the voltages $V_{M_1M_2}$ and $V_{M_2M_3}$ must be measured with at least 3-digit (0.1 nV) accuracy in 10-ohm-m beds. This may be the limit of what can be achieved with the state of the art voltage amplifiers within a reasonable integration time of several minutes.

Figure 7:
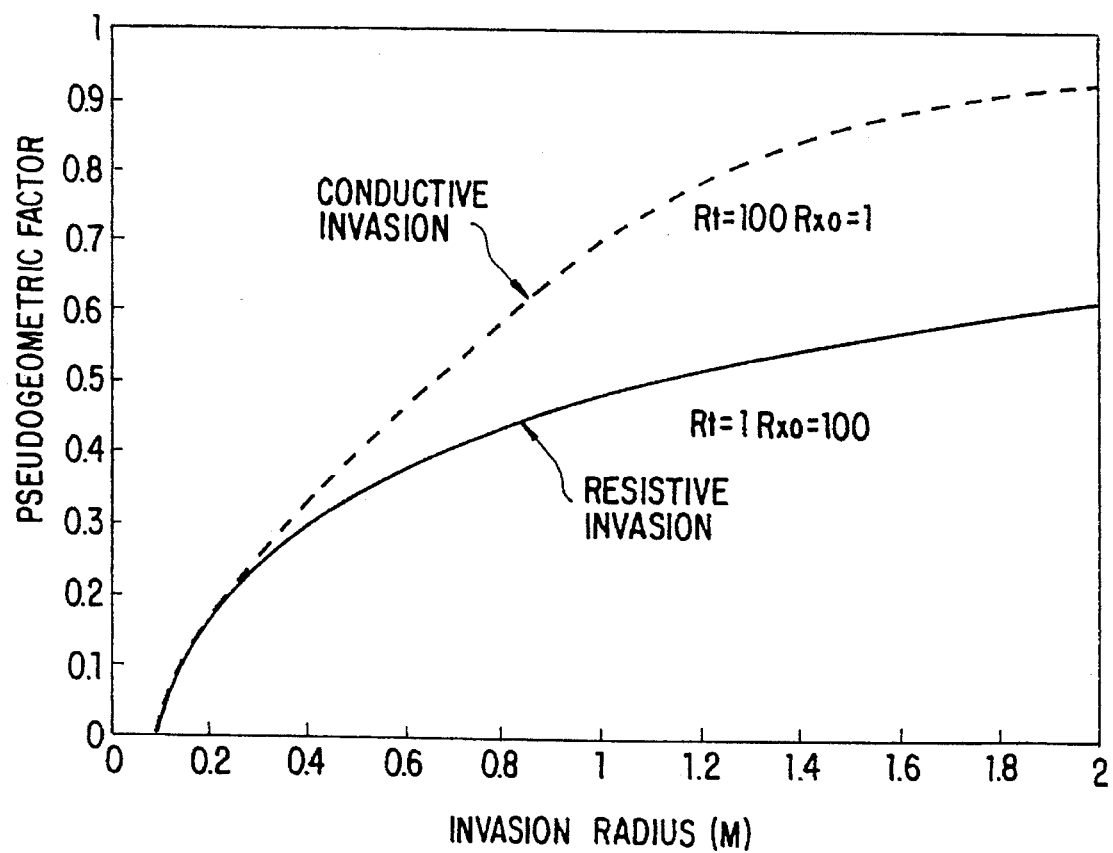
FIG. 7 shows the pseudogeometric factor as a function of invasion radius.

The Pseudogeometric factor of the proposed measurement, which is defined as $$J = \frac{R_a - R_t}{R_{xo} - R_t} \qquad (22)$$

is shown as a function of the invasion radius in FIG. 7. In the definition above, $R_a$ is the apparent resistivity, $R_t$ is the resistivity of the formation, and $R_{xo}$ is the resistivity of the invaded region. FIG. 7 also shows that the depth of investigation is strongly dependent on the resistivity profile and contrast.

We claim:

1. A method of determining the resistivity of an underground formation surrounding a borehole which is lined with a casing comprising the steps of:
    a) causing a first current to flow in a first direction along a first part of the casing and measuring voltage across the first part;
    b) causing a second current to flow in a second, opposite direction along a second part of the casing and measuring voltage across the second part, said second part being spaced from the first pan by an intermediate region;
    c) measuring voltages between a point in the first part of the casing and a point in the intermediate region to obtain a first voltage measurement, and between a point in the second part of the casing and the point in the intermediate region to obtain a second voltage measurement; and
    d) using the first and second voltage measurements to derive the resistivity of the formation from the voltages.

2. A method as claimed in claim 1, comprising causing the first and second currents to flow simultaneously in the first and second directions respectively.

3. A method as claimed in claim 1, wherein the first current and the second current are caused to flow one after the other.

4. A method as claimed in claim 1, wherein the point in the intermediate region is substantially equidistantly spaced between the points in the first and second pans of the casing.

5. A method as claimed in claim 1, wherein the currents caused to flow in the first and second directions are such that there is substantially no potential difference across the intermediate region.

6. A method as claimed in claim 1, further comprising the steps of:
    passing a current of known magnitude along the intermediate region and measuring a voltage across the region and deriving the resistance of the region from the magnitude of the current and the measured voltage; and
    deriving the resistivity of the formation from the voltages and the derived resistance of the intermediate region.

7. A method as claimed in claim 6, comprising passing said current along the intermediate region and deriving the resistance of the region separately from passing currents through the first and second parts of the casing and measuring said voltages.

8. A method as claimed in claim 6, comprising measuring a voltage across the region while causing current to flow in the first and second directions.

9. A method of determining the resistivity of an underground formation surrounding a borehole which is lined with a casing comprising the steps of:
    a) causing a first current to flow in a first direction along a first part of the casing and measuring voltage across the first part;
    b) causing a second current to flow in a second, opposite direction along a second part of the casing and measuring voltage across the second part, said second part being spaced from the first part by an intermediate region;
    c) measuring voltages between a point in the first part of the casing and a point in the intermediate region to obtain a first voltage measurement, and between a point in the second part of the casing and the point in the intermediate region to obtain a second voltage measurement;
    d) measuring the resistance of the intermediate region of the casing; and
    e) using the first and second voltage measurements and the measurement of the resistance of the intermediate region to derive the resistivity of the formation from the voltages.

10. A method as claimed in claim 9, wherein:
    step a) comprises measuring voltage between a first point adjacent to the intermediate region and a first remote point spaced therefrom;
    step b) comprises measuring voltage between a second point adjacent to the intermediate region and a second remote point spaced therefrom; and
    step c) comprises measuring voltage between the point in the intermediate region and the first point to obtain the first voltage measurement, and measuring voltage between the point in the intermediate region and the second point to obtain the second voltage measurement.

11. Apparatus for use in determining the resistivity of an underground formation surrounding a borehole which is lined with a casing, the apparatus comprising a body including first and second parts separated by an intermediate region, wherein:
    a) the first body part comprises first current source means including spaced electrodes arranged so as to enable a current to flow in a corresponding first part of the casing and first voltage monitoring means including spaced electrodes for sensing a voltage across said first part of the casing;
    b) the second body part comprises second current source means including spaced electrodes arranged so as to enable a current to flow in a corresponding second part of the casing and second voltage monitoring means including spaced electrodes for sensing a voltage across said second part of the casing;
    c) the intermediate region comprises first intermediate voltage monitoring means including electrodes for sensing a first voltage between a point in the first part of the casing and a point in a corresponding intermediate region of the casing, and second intermediate voltage monitoring means including electrodes for sensing a second voltage between a point in the second part of the casing and the point in the intermediate region of the casing.

12. Apparatus as claimed in claim 11, further comprising voltage analysis means connected to said first and second voltage monitoring means and said first and second intermediate voltage monitoring means for determining the resistivity of the underground formation.

13. Apparatus as claimed in claim 12, wherein the voltage analysis means is located at ground level and is connected to the voltage monitoring means via a wireline cable.

14. Apparatus as claimed in claim 11, wherein the electrodes of the first and second intermediate voltage monitoring means are arranged such that the point in the intermediate region of the casing is substantially equidistantly spaced from the points in the first and second parts of the casing.

15. Apparatus as claimed in claim 11, wherein the first current source means causes a current to flow in an opposite direction to that from the second current source.

16. Apparatus as claimed in claim 15, wherein the first and second current source means operate so as to cause currents to flow simultaneously in opposite directions respectively.

17. Apparatus as claimed in claim 11, wherein the intermediate region comprises intermediate current source means including electrodes for passing a current through the corresponding intermediate region of the casing.

18. Apparatus as claimed in claim 17, wherein the intermediate current source means operates only when the first and second current source means are not operating.

19. Apparatus as claimed in claim 17, comprising at least one electrode which is common to the intermediate current source means and the first current source means and at least one electrode which is common to the intermediate current source means and second current source means.

20. Apparatus as claimed in claim 11, comprising at least one electrode which is common to the first intermediate voltage monitoring means and the first voltage monitoring means and at least one electrode which is common to the intermediate voltage monitoring means and second voltage monitoring means.

21. Apparatus for use in determining the resistivity of an underground formation surrounding a borehole which is lined with a casing, the apparatus comprising a body including first and second parts separated by an intermediate region, wherein:

a) the first body part comprises first current source means including spaced current electrodes arranged so as to enable a current to flow in a corresponding first part of the casing and first voltage monitoring means including spaced monitor electrodes for sensing a voltage across said first part of the casing;

b) the second body part comprises second current source means including spaced current electrodes arranged so as to enable a current to flow in a corresponding second part of the casing and second voltage monitoring means including spaced monitor electrodes for sensing a voltage across said second part of the casing;

c) the intermediate region comprises an intermediate monitor electrode, first intermediate voltage monitoring means connected between the intermediate electrode and an adjacent one of the monitor electrodes of the first voltage monitoring means for sensing a first voltage between a point in the first part of the casing and a point in a corresponding intermediate region of the casing, and second intermediate voltage monitoring means connected between the intermediate electrode and an adjacent one of the monitor electrodes of the second voltage monitoring means for sensing a second voltage between a point in the second part of the casing and the point in the intermediate region of the casing.

\* \* \* \* \*